United States Patent
Hong et al.

(10) Patent No.: US 8,916,057 B2
(45) Date of Patent: Dec. 23, 2014

(54) ROLL-TO-ROLL TRANSFER METHOD OF GRAPHENE, GRAPHENE ROLL PRODUCED BY THE METHOD, AND ROLL-TO-ROLL TRANSFER EQUIPMENT FOR GRAPHENE

(75) Inventors: Byung Hee Hong, Seoul (KR); Jonghyun Ahn, Suwon-si (KR); Sukang Bae, Suwon-si (KR); Hyeong Keun Kim, Hwaseong-si (KR)

(73) Assignee: Graphene Square, Inc., Seoul (KR)

( * ) Notice: Subject to any disclaimer, the term of this patent is extended or adjusted under 35 U.S.C. 154(b) by 0 days.

(21) Appl. No.: 13/447,548

(22) Filed: Apr. 16, 2012

(65) Prior Publication Data
US 2012/0258311 A1  Oct. 11, 2012

Related U.S. Application Data

(63) Continuation of application No. PCT/KR2010/007140, filed on Oct. 16, 2010.

(30) Foreign Application Priority Data

Oct. 16, 2009 (KR) .................. 10-2009-0098544

(51) Int. Cl.
*C03C 15/00* (2006.01)
*B82Y 40/00* (2011.01)
*B82Y 30/00* (2011.01)
*C01B 31/04* (2006.01)

(52) U.S. Cl.
CPC ............. *C01B 31/0438* (2013.01); *B82Y 40/00* (2013.01); *B82Y 30/00* (2013.01)
USPC ........ 216/83; 327/581; 257/29; 257/E29.082; 257/E21.041

(58) Field of Classification Search
USPC .............. 216/83; 327/581; 257/29, E29.082, 257/E21.041
See application file for complete search history.

(56) References Cited

U.S. PATENT DOCUMENTS

| 2008/0312088 A1 | 12/2008 | Chung et al. | |
|---|---|---|---|
| 2009/0140801 A1* | 6/2009 | Ozyilmaz et al. | 327/581 |
| 2009/0146111 A1* | 6/2009 | Shin et al. | 252/510 |

FOREIGN PATENT DOCUMENTS

| JP | H07-246668 A | 9/1995 |
|---|---|---|
| JP | 2000-269530 | 9/2000 |
| JP | 2007-335256 A | 12/2007 |
| JP | 2008-063196 | 3/2008 |
| JP | 2008-536710 | 9/2008 |
| JP | 2009-062247 A | 3/2009 |
| JP | 2009-107921 | 5/2009 |
| JP | 2009-18807 | 8/2009 |
| JP | 2011-503243 | 1/2011 |
| KR | 10-2009-0051439 | 5/2009 |
| KR | 10-2009-0056117 A | 6/2009 |
| WO | WO 2008/108383 A1 | 9/2008 |

OTHER PUBLICATIONS

Kim et al. Nature vol. 457, (2009) pp. 706-710.*

(Continued)

*Primary Examiner* — Lan Vinh
*Assistant Examiner* — Maki Angadi
(74) *Attorney, Agent, or Firm* — Greer Burns & Crain Ltd.

(57) ABSTRACT

The present disclosure relates to a graphene roll-to-roll transfer method, a graphene roll-to-roll transfer apparatus, a graphene roll manufactured by the graphene roll-to-roll transfer method, and uses thereof.

17 Claims, 20 Drawing Sheets

(56) References Cited

OTHER PUBLICATIONS

Ahn et al. Advanced Materials, vol. 20, (2008) pp. 2044-2049).*
Soppe W.J. et al. 24th European Photovoltaic Solar Energy & Echibition, Sep. 21-25, 2009, Hamburg, Germany, pp. 1-4.*
International Search Report issued in counterpart International Application No. PCT/KR2010/007140 on Aug. 1, 2011 (3 pages).
Kim, Keun Soo and et al. "Large-scale pattern growth of graphene films for stretchable transparent electrodes." Nature. vol. 457, Feb. 5, 2009 (5 pages).
Reina et al., "Large Area, Few-Layer Graphene Films on Arbitrary Substrates by Chemical Vapor Deposition", Nano letters 2009, Dec. 1, 2008, p. 30-35.
Bae, Sukang, et al., "Roll-to-roll production of 30-inch graphene films for transparent electrodes," Nature Nanotechnoloy, vol. 5 Aug. 2010, Published Online Jun. 20, 2010, pp. 574-578 (in English, 5 pages).
Japanese office action issued in corresponding Japanese App. No. 2012-534122, mailed Sep. 24, 2012 (with translation).
Chinese office action issued in counterpart Chinese App. No. 201080053934.1, mailed Dec. 2, 2013 (with translation).
Soppe et al.; "Roll to Roll Fabrication Process of Thin-Film Silicon Solar Cells on Steel Foil"; 24th European Photovoltaic Solar Energy Conference and Exhibition; pp. 21-25; Sep. 21, 2009.
Ahn et al.; "High-Speed Roll to Roll Nanoimprint Lithography on Flexible Plastic Substrates"; Advanced Materials, pp. 2044-2049; Dec. 31, 2008.

\* cited by examiner

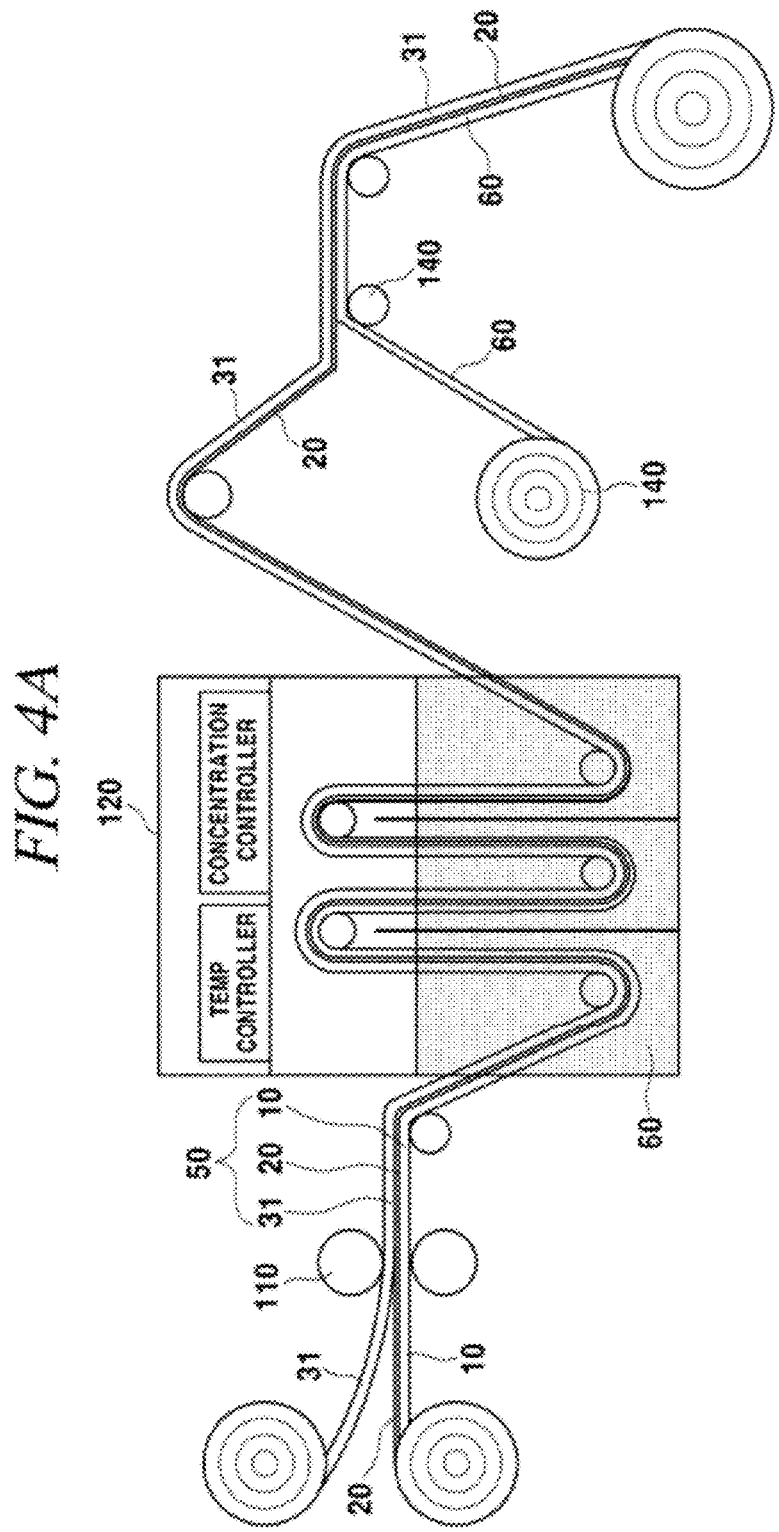

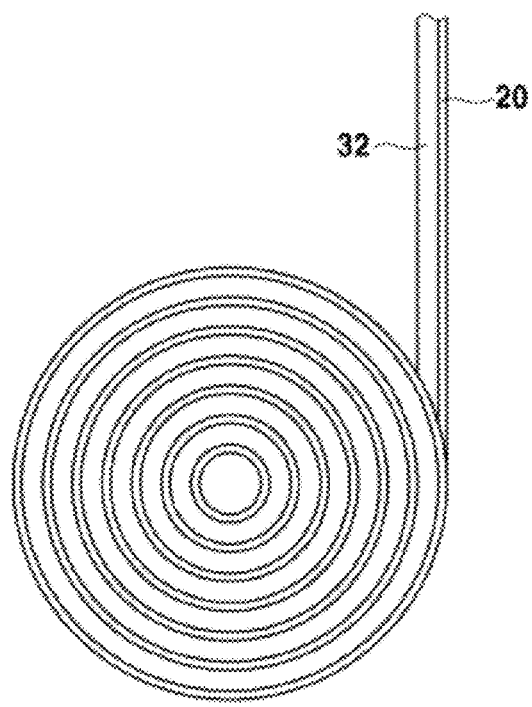

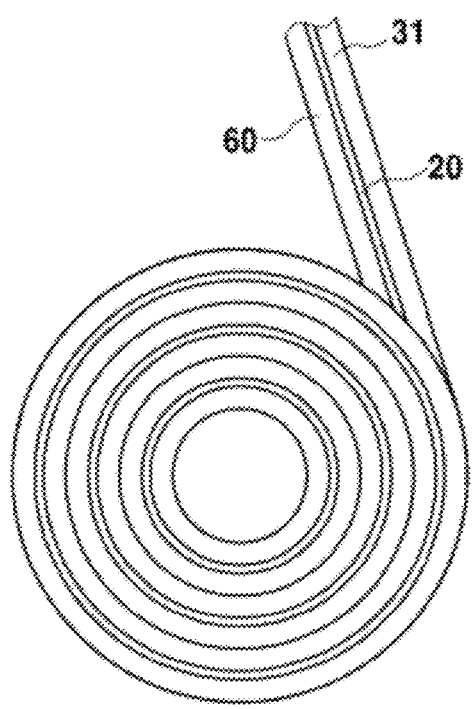

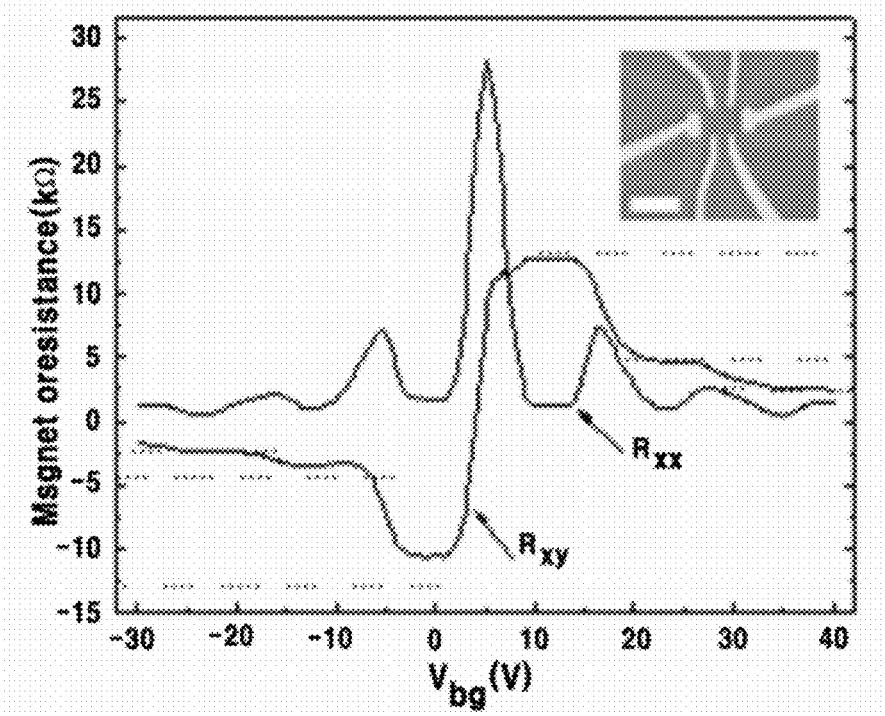

ROLL-TO-ROLL TRANSFER METHOD OF GRAPHENE, GRAPHENE ROLL PRODUCED BY THE METHOD, AND ROLL-TO-ROLL TRANSFER EQUIPMENT FOR GRAPHENE

This application is a continuation of PCT/KR2010/007140 filed Oct. 16, 2010.

TECHNICAL FIELD

The present disclosure relates to a graphene roll-to-roll transfer method, a graphene roll-to-roll transfer apparatus, a graphene roll manufactured by the graphene roll-to-roll transfer method, and uses thereof.

BACKGROUND ART

Fullerene, carbon nanotubes, graphene, graphite, and the like are low-dimensional nano-materials composed of carbon atoms. That is, carbon atoms arranged in a hexagonal shape may form zero-dimensional fullerene formed of a ball, may form carbon nanotubes one-dimensionally rolled, may form graphene of a two-dimensional monolayer, and may form graphite three-dimensionally stacked.

In particular, graphene has very stable and excellent electrical, mechanical, and chemical characteristics and is a very excellent conductive material in which electrons can move about 100 times faster than in silicon and current flows about 100 times more than in copper. This was demonstrated through experiments in 2004 when a method of separating graphene from graphite was found. Since then, a great deal of research on this matter has been carried out.

Herein, a graphene layer is subject to large-area synthesis in a wafer substrate or a metal substrate, and, thus, in order to apply the graphene layer to an electronic device, a process of transferring the graphene layer to an electrode substrate of the electronic device is needed. At present, as a transfer method of a typical large-area graphene layer, there is a method in which a wafer on which a graphene layer is grown is adhered to a polydimethylsiloxane (PDMS) substrate and while being immersed in an etching solution, the graphene layer is transferred to the PDMS substrate by means of catalytic etching. Through a process of transferring the graphene layer of the PDMS to substrates, such as polyethylen terephthalate, polyimide film, and glass, of various electronic devices, a large-area transfer of the graphene layer can be made. In this transfer method of the graphene layer, the catalytic etching is performed via the etching solution, and, thus, a lot of time for etching is required. In case of a large-area graphene layer (of about 4 inches or greater), a transfer process needs catalytic etching for at least about one or more days. If a graphene layer is commercially manufactured, such a long-time etching process may result in time inefficiency and high cost in mass production of film, and, thus, it may be difficult to apply to actual production. Therefore, for industrial application of a graphene layer, a method of transferring a large-area graphene film with low cost in a short time is highly demanded.

DISCLOSURE OF THE INVENTION

Problems to be Solved by the Invention

In view of the foregoing, illustrative embodiments provide a graphene roll-to-roll transfer method capable of transferring a large-area graphene layer to various kinds of flexible and/or extensible substrates with low cost, a graphene roll-to-roll transfer apparatus, a graphene roll manufactured by the graphene roll-to-roll transfer method, and uses thereof.

However, the problems to be solved by the present disclosure are not limited to the above description and other problems can be clearly understood by those skilled in the art from the following description.

Means for Solving the Problems

In accordance with one aspect of the present disclosure, there is provided a graphene roll-to-roll transfer method comprising forming a layered structure including substrate-graphene layer-first flexible substrate from a graphene layer formed on a substrate and a first flexible substrate in contact with the graphene layer by a first roller unit; and immersing the layered structure in an etching solution and passing through the etching solution by using a second roller unit to remove the substrate from the layered structure and to transferring the graphene layer onto the first flexible substrate at the same time.

In accordance with another aspect of the present disclosure, there is provided a graphene roll-to-roll transfer apparatus comprising a first roller unit that forms a layered structure including substrate-graphene layer-first flexible substrate; and a second roller unit that removes the substrate from the layered structure by immersing the layered structure provided by the first roller unit into an etching solution and transfers the graphene layer onto the first flexible substrate at the same time.

In accordance with still another aspect of the present disclosure, there is provided a graphene roll comprising a graphene layer formed on a flexible substrate by roll-to-roll transfer process.

In accordance with still another aspect of the present disclosure, there is provided a device manufactured by using a graphene roll comprising a graphene layer formed on a flexible.

Effect of the Invention

In accordance with the illustrative embodiments, it is possible to easily transfer a large-area graphene layer to a flexible substrate with low cost in a short time by a roll-to-roll etching and/or transfer process. Further, a technique of transferring the graphene layer on the flexible substrate by the roll-to-roll process can be applied to a process of manufacturing various devices and flexible electronic devices.

BRIEF DESCRIPTION OF THE DRAWINGS

FIGS. 4A and 4B are diagrams showing a graphene roll-to-roll transfer apparatus further performing a protection layer forming process in accordance with an illustrative embodiment;

FIGS. 5A to 5C illustrates cross sections of a graphene roll in accordance with an illustrative embodiment;

FIG. 10(a) shows a Raman spectrum when one to four graphene layers are stacked and FIG. 10(b) is a graph showing transmittance at that time;

FIGS. 11A to 11D are graphs showing electrical characteristics of the graphene layer grown on the Cu foil in accordance with the example 2. FIG. 11A is a graph showing a resistance change when one to four graphene layers are transferred by using a roll-to-roll transfer method, FIG. 11B is a graph for comparison with conventional transparent electrode materials, FIG. 11C is a graph confirming that a quantum hall effect occurs and proving that a quality of graphene is very high, and FIG. 11D is a graph showing that flexibility of graphene is very high;

BEST MODE FOR CARRYING OUT THE INVENTION

Figure 1:
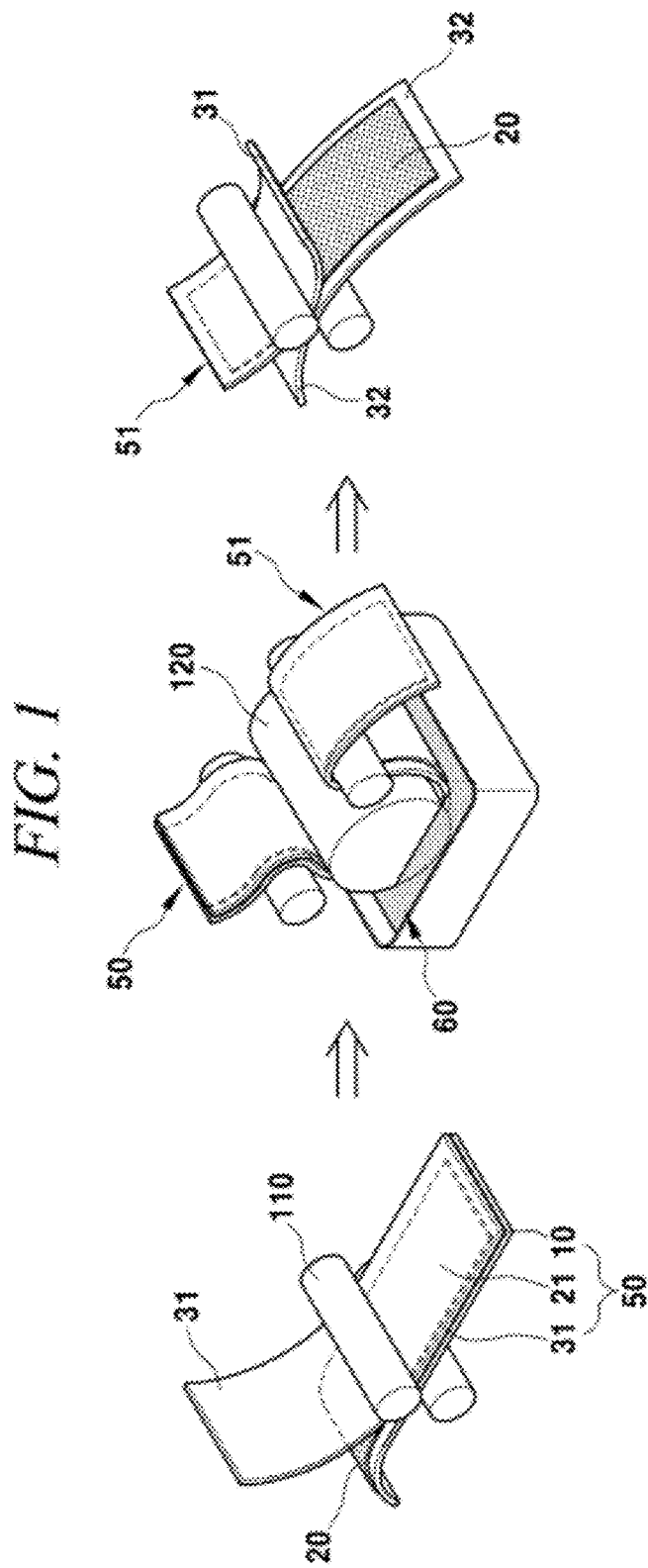
FIG. 1 is a diagram showing a process of transferring a large-area graphene layer onto a second flexible substrate and a transfer apparatus related thereto in accordance with an illustrative embodiment.

Hereinafter, embodiments and examples of the present disclosure will be described in detail with reference to the accompanying drawings so that the present disclosure may be readily implemented by those skilled in the art.

However, it is to be noted that the present disclosure is not limited to the embodiments and examples but can be embodied in various other ways. In drawings, parts irrelevant to the description are omitted for the simplicity of explanation, and like reference numerals denote like parts through the whole document.

Through the whole document, the term "on" that is used to designate a position of one layer or element with respect to another layer or element includes both a case that the one layer or element is adjacent to the another layer or element and a case that any other layer or element exists between these two layers or elements. Further, the terms "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

The term "graphene layer" means layer or sheet-shaped graphene in which numerous carbon atoms are joined together with a multiple covalent bond to form a polycyclic aromatic molecule and the carbon atoms joined together with a multiple covalent bond have a six-membered ring as a fundamental repeat unit and may further include a five-membered ring and/or a seven-membered ring. Therefore, the graphene layer looks like a monolayer of carbon atoms forming covalent bonds (typically, $sp^2$ bonding). The graphene layer may have various structures and these structures may depend on a five-membered ring content and/or a seven-membered ring content of graphene. As described above, the graphene layer may be formed of a monolayer of graphene and can be formed of multiple stacked layers. Typically, a side end of the graphene may be saturated with hydrogen atoms.

The term "roller unit" means a roll-to-roll apparatus comprised of one or more rollers and a shape and/or a size and/or arrangement of rollers are not limited.

A graphene roll-to-roll transfer method in accordance with one aspect of the present disclosure includes forming a layered structure including substrate-graphene layer-first flexible substrate from a graphene layer formed on a substrate and a first flexible substrate in contact with the graphene layer by a first roller unit; and immersing the layered structure in an etching solution and passing through the etching solution by using a second roller unit to remove the substrate from the layered structure and to transferring the graphene layer onto the first flexible substrate at the same time.

In an illustrative embodiment, the graphene roll-to-roll transfer method may further include, but is not limited to, transferring the graphene layer on the first flexible substrate onto a second flexible substrate by a third roller unit.

In the illustrative embodiment, the graphene roll-to-roll transfer method may further include, but is not limited to, performing a heat treatment to the graphene layer at the same time when the graphene layer is transferred onto the second flexible substrate.

In the illustrative embodiment, a first roller unit to a fifth roller unit may include one or more rollers. If the first to fifth roller units include a plurality of rollers, a position and a shape of each roller which can be typically used to perform a roll-to-roll process in the art are not limited.

In the illustrative embodiment, the first roller unit may be, but is not limited to, an adhesion roller.

In the illustrative embodiment, the second roller unit and the third roller unit may be, but are not limited to, transfer rollers.

In the illustrative embodiment, the transferring the graphene layer onto a second flexible substrate is performed by rolling the first flexible substrate onto which the graphene layer is transferred and the second flexible substrate in contact with the graphene layer by, but not limited to, a transfer roller.

In the illustrative embodiment, the graphene roll-to-roll transfer method may further include, but is not limited to, forming a protection layer on the graphene layer transferred onto the first flexible substrate or on the graphene layer transferred onto the second flexible substrate by a fourth roller unit.

In the illustrative embodiment, the graphene roll-to-roll transfer method may further include, but is not limited to, cleaning and/or drying the graphene layer transferred onto the first flexible substrate.

In the illustrative embodiment, each of the first flexible substrate and the second flexible substrate has one or more characteristics including transparency, flexibility, and extendibility.

In the illustrative embodiment, the graphene layer formed on the substrate is formed by, but not limited to, supplying heat and a reaction gas containing a carbon source to the substrate to make a reaction and grow graphene on the substrate. Herein, the growth of the graphene layer can be carried out under a atmospheric pressure, a low pressure, or a vacuum. If the process is carried out under a atmospheric pressure, a large-area graphene layer can be manufactured through a simple process with low cost. Further, the process is carried out under a low pressure or a vacuum, a high-quality graphene layer can be manufactured.

In the illustrative embodiment, the substrate has one or more characteristics including, but not limited to, transparency, flexibility, and extendibility.

In the illustrative embodiment, the substrate contains one or more metals or alloys selected from the group consisting of, but not limited to, silicon, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

In the illustrative embodiment, the substrate further contains, but is not limited to, a catalyst layer. The catalyst layer serves as a catalyst for graphene growth and the catalyst layer contains one or more metals or alloys selected from the group consisting of, but not limited to, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

In the illustrative embodiment, the substrate has, but is not limited to, a roll shape, a foil shape, a tube shape, a plate shape, sheet shape or a wire shape and more desirably, in a roll shape or foil shape.

In the illustrative embodiment, each of the first flexible substrate and/or the second flexible substrate contains a polymer, for example, but not limited to, a thermal release polymer. The thermal release polymer can be selected appropriately from those known in the art by those skilled in the art. By way of example, as the first flexible substrate, PDMS and various poly urethane-based films known in the art can be used. Otherwise, a water-based adhesive as an eco-friendly adhesive, a water-soluble adhesive, a vinyl acetate emulsion adhesive, a hot-melt adhesive, a photo curable (UV, visible light, electron ray, UV/EB curable) adhesive, and a photosoftening (UV, visible light, electron ray, UV/EB) tape can be used. Further, PBI (polybenizimidazole), PI (polyimide), silicone/imide, BMI (bismaleimide), and modified epoxy resin as a high-temperature adhesive can be used. Furthermore, a typical adhesive tape can be used.

In the illustrative embodiment, an adhesive layer is formed on the first flexible substrate in contact with the graphene layer and the adhesive layer is formed of, but not limited to, an adhesive tape, glue, epoxy resin, a photosoftening tape (UV, visible light, electron ray, UV/EB), a thermal release tape or a water-soluble tape. The adhesive layer makes it easy to adhere and/or release the graphene layer.

In the illustrative embodiment, a substrate to which a roll-to-roll process can be applied can be used as the first flexible substrate and/or the second flexible substrate. By way of example, the large-area graphene layer can be transferred to various substrates, such as PET (polyethylen terephthalate), polyimide film, glass, PEN (polyethylene naphthalate), PC (polycarbonate), plastic, and rubber, of electronic devices.

In the illustrative embodiment, the etching solution is a solution capable of selectively etching and removing a metal foil layer that contains the catalyst. By way of example, the etching solution may be a solution containing, but not limited to, ammonium persulfate $((NH_4)_2S_2O_8)$, HF, BOE, Fe$(NO_3)_3$, iron(III) chloride $(FeCl_3)$ or $CuCl_2$.

As described above, in the graphene roll-to-roll transfer method, a graphene layer can be transferred to various substrates through a simple process with low cost. The graphene is highly transparent, so that it can be applied to various electrical and electronic devices and particularly, electrodes of various electrical and electronic devices. By way of example, a graphene transparent electrode can be applied for photo electromagnetic application to various electrodes of various electrical and electronic devices such as next-generation field effect transistors requiring flexibility and/or extendibility or diodes, or solar cells, touch sensors and a flexible electronic technical field related thereto.

A graphene roll-to-roll transfer apparatus in accordance with another aspect of the present disclosure includes a first roller unit that forms a layered structure including substrate-graphene layer-first flexible substrate; and a second roller unit that removes the substrate from the layered structure by immersing the layered structure provided by the first roller unit into an etching solution and transfers the graphene layer onto the first flexible substrate at the same time.

In an illustrative embodiment, the graphene roll-to-roll transfer apparatus may further include, but is not limited to, a third roller unit that transfers the graphene layer transferred from the first flexible substrate onto a second flexible substrate.

In the illustrative embodiment, the graphene roll-to-roll transfer apparatus may further include, but is not limited to, a fifth roller unit provided between the second roller unit and the third roller unit and configured to perform a cleaning process and/or drying process to the layered structure.

In the illustrative embodiment, the graphene roll-to-roll transfer apparatus may further include, but is not limited to, a fourth roller unit that forms a protection layer on the graphene layer formed on the first flexible substrate or the graphene layer formed on the second flexible substrate.

Besides, the graphene roll-to-roll transfer apparatus may include all the matters of the graphene roll-to-roll transfer method as described above, but redundant description thereof will be omitted for convenience sake.

In accordance with still another aspect of the present disclosure, there is provided a graphene roll including a graphene layer formed on a flexible substrate by a roll-to-roll transfer method.

In an illustrative embodiment, the graphene layer may include, but is not limited to, one to fifty layers of graphene.

In the illustrative embodiment, the graphene roll may further include, but is not limited to, a protection layer.

In the illustrative embodiment, the graphene roll is manufactured by a graphene roll-to-roll transfer method in accordance with an illustrative embodiment. Besides, the graphene roll may include all the matters of the graphene roll-to-roll transfer method or the graphene roll-to-roll transfer apparatus as described above, but redundant description thereof will be omitted for convenience sake.

In accordance with still another aspect of the present disclosure, there is provided a device manufactured by using a graphene roll formed on a substrate in accordance with an illustrative embodiment.

In an illustrative embodiment, the graphene roll formed on a substrate in accordance with an illustrative embodiment is manufactured by, but not limited to, any one of graphene roll-to-roll transfer methods in accordance with illustrative embodiments.

In the illustrative embodiment, the device is formed on a substrate having one or more characteristics including, but not limited to, transparency, flexibility, and extendibility.

In the illustrative embodiment, the graphene is contained as, but not limited to, an electrode material. Besides, the device may include all the matters of the graphene roll-to-roll transfer method or the graphene roll-to-roll transfer apparatus as described above, but redundant description thereof will be omitted for convenience sake.

Hereinafter, illustrative embodiments and examples of a graphene roll-to-roll transfer method and transfer apparatus, and a graphene roll manufactured by using the same will be explained in detail with reference to the accompanying drawings. However, the present disclosure is not limited thereto.

FIG. 1 is a diagram showing a process of transferring a large-area graphene layer 20 onto a first flexible substrate 31 and/or a second flexible substrate 32 and a transfer apparatus related thereto in accordance with an illustrative embodiment.

To be more specific, the above-described process includes forming a stacked (layered) body 50 of metal substrate-graphene layer-first flexible substrate by bringing the first flexible substrate 31 into contact with the graphene layer 20 formed on a substrate 10 and allowing a first roller unit 110 to pass therethrough (step S1); removing the substrate 10 from the layered structure 50 and transferring the graphene layer 20 onto the first flexible substrate 31 by allowing a second roller unit 120 to pass through the layered structure 50 which is immersed in an etching solution 60 (step S2); and transferring the graphene layer 20 on the first flexible substrate 31 onto the second flexible substrate 32 by using a third roller unit 130 (step S3). Herein, the first roller unit 110 may be an adhesion roller and the second roller unit 120 and the third roller unit 130 may be transfer rollers.

Herein, the substrate 10 may be provided alone or may further include a catalyst layer (not illustrated). A material of the substrate 10 is not limited and may contain one or more metals or alloys selected from the group consisting of, for example, silicon, Ni, Co, Fe, Pt, Au, Al, Cr, Cu, Mg, Mn, Mo, Rh, Si, Ta, Ti, W, U, V, Zr, brass, bronze, white brass, stainless steel, and Ge. If the substrate 10 is made of metal, the metal substrate 10 may serve as a catalyst for forming a graphene layer. However, the substrate 10 may not be made of metal. By way of example, the substrate 10 may be made of silicon and a silicon oxide layer obtained by oxidizing the silicon substrate 10 for forming a catalyst layer may be further formed on the silicon substrate 10.

Further, a catalyst layer may be formed on the substrate 10 to make it easy to grow the graphene layer 20. The catalyst layer is not limited in material, thickness, and shape. By way of example, the catalyst layer may be made of one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge, or may be made of the same material or a different material as compared with the substrate 10. Further, the catalyst layer is not limited in thickness and can be a thin film or a thick film.

As a method of forming the graphene layer 20 on the substrate 10, a chemical vapor deposition method typically used in the art for growing graphene can be used without limitation. By way of example, the chemical vapor deposition method may include, but is not limited to, rapid thermal chemical vapor deposition (RTCVD), inductively coupled plasma-chemical vapor deposition (ICP-CVD), low pressure chemical vapor deposition (LPCVD), atmospheric pressure chemical vapor deposition (APCVD), metal organic chemical vapor deposition (MOCVD) or plasma-enhanced chemical vapor deposition (PECVD).

A process of growing the graphene layer 20 can be carried out under a atmospheric pressure, a low pressure, or a vacuum. By way of example, if the process is carried out under a atmospheric pressure, helium (He) may be used as a carrier gas, so that it is possible to minimize damage to graphene caused by collisions against heavy argon (Ar) at high temperatures. Further, if the process is carried out under a atmospheric pressure, it is possible to manufacture a large-area graphene layer through a simple process with low cost. Meanwhile, if the process is carried out under a low pressure or a vacuum, hydrogen ($H_2$) is used as an ambient gas and by increasing a temperature, an oxidized surface of a metallic catalyst is deoxidized, so that high-quality graphene can be manufactured.

The graphene layer 20 manufactured by the above-described method may have a large area with a horizontal or longitudinal length of about 1 mm to about 1000 m. Further, the graphene layer 20 includes a graphene layer having a homogeneous structure with few or zero defects. The graphene layer 20 manufactured by the above-described method may include one or more layers of graphene. For non-limited example, a thickness of the graphene layer 20 can be adjusted between one layer and fifty layers.

In an illustrative embodiment of forming the graphene layer 20 on the substrate 10, a roll-shaped metal substrate is put in a pipe-shaped furnace, a reactant gas containing a carbon source is supplied thereto, a heat treatment is performed under a atmospheric pressure to grow a graphene layer, and the graphene layer 20 formed on the metal substrate is brought into contact with the first flexible substrate 31 by using the first roller unit 110, so that the layered structure 50 of metal substrate-graphene layer-first flexible substrate can be formed. If a heat treatment is performed in a range of, for example, from about 300° C. to about 2000° C. while the carbon source such as carbon monoxide, carbon dioxide, methane, ethane, ethylene, ethanol, acetylene, propane, butane, butadiene, pentane, pentene, cyclopentadiene, hexane, cylcohexane, benzene, and toluene is supplied in the form of gas, carbon components contained in the carbon source are combined with each other to form a hexagonal plate structure and the graphene layer 20 can be grown.

To be specific, the first flexible substrate 31 is brought into contact with the graphene layer 20 formed on the substrate and provided to the first roller unit 110. The first flexible substrate 31 may further include an adhesive layer formed on its surface to make it easy to transfer the graphene layer from the substrate. A material of the adhesive layer is not limited if it can be usually used by those skilled in the art for easy transfer. By way of example, the adhesive layer may include, but is not limited to, an adhesive tape, glue, epoxy resin), a photosoftening tape (UV, visible light, electron ray, UV/EB), a thermal release tape or a water-soluble tape.

The above-described chemical vapor deposition method is advantageous for growing large-area graphene but requires a hard substrate that can resist an etching process for removing a catalyst layer and a high temperature of about 900° C. or more. Thus, in the chemical vapor deposition method, a use of graphene grown on the substrate or a use of a polymer substrate at low temperatures may be limited. Therefore, in the present disclosure, a process of transferring a graphene layer onto a flexible substrate using a roll-to-roll process is fundamentally required for a flexible/extendible polymer-based electronic device. However, the transfer of the graphene layer is limited in a range of several inches due to inhomogeneity of reaction temperatures in a CVD furnace and a limitation on a size of the hard substrate. Therefore, in the present disclosure, a large-area graphene layer is easily transferred by using a roll-to-roll transfer apparatus. Hereinafter, a process of transferring a graphene layer using a roll-to-roll process will be explained in more detail.

As described above, the layered structure 50 of metal substrate-graphene layer-first flexible substrate is formed by bringing the first flexible substrate 31 into contact with the graphene layer 20 formed on the substrate 10 and allowing the first roller unit 110 to pass therethrough (step S1). Before the layered structure 50 is provided to the second roller unit 120, a cooling process or a plasma process as a pre-treatment may be further performed thereto. The first roller unit 110 may be configured as a pair of a lower roller and an upper roller facing each other as depicted in FIG. 1 and may further include a plurality of rollers if necessary. By way of example, if a process in step S1 takes a long time, a plurality of rollers may be further provided on the metal substrate in order to prevent the graphene layer 20, the first flexible substrate 31 or the layered structure 50 from being bent or drooping downwards.

Then, the substrate 10 is removed from the layered structure 50 and at the same time, the graphene layer 20 is transferred onto the first flexible substrate 31 by allowing the second roller unit 120 to pass through the layered structure 50 which is immersed in the etching solution 60 (step S2). The etching solution 60 is an aqueous solution capable of selectively etching only a substrate or a substrate including a catalyst layer and may include, but is not limited to, ammonium persulfate $((NH_4)_2S_2O_8)$, HF, BOE, $Fe(NO_3)_3$, iron(III) chloride $(FeCl_3)$ or $CuCl_2$. The etching solution may be selected depending on a kind of a substrate. By way of example, if the substrate is made of Ni or Cu, an etching process may be performed by using $FeCl_3$. Instead of the above-described etching process, the substrate can be removed by a reactive ion etching process, an ion milling process, or an ashing process.

Figure 2:
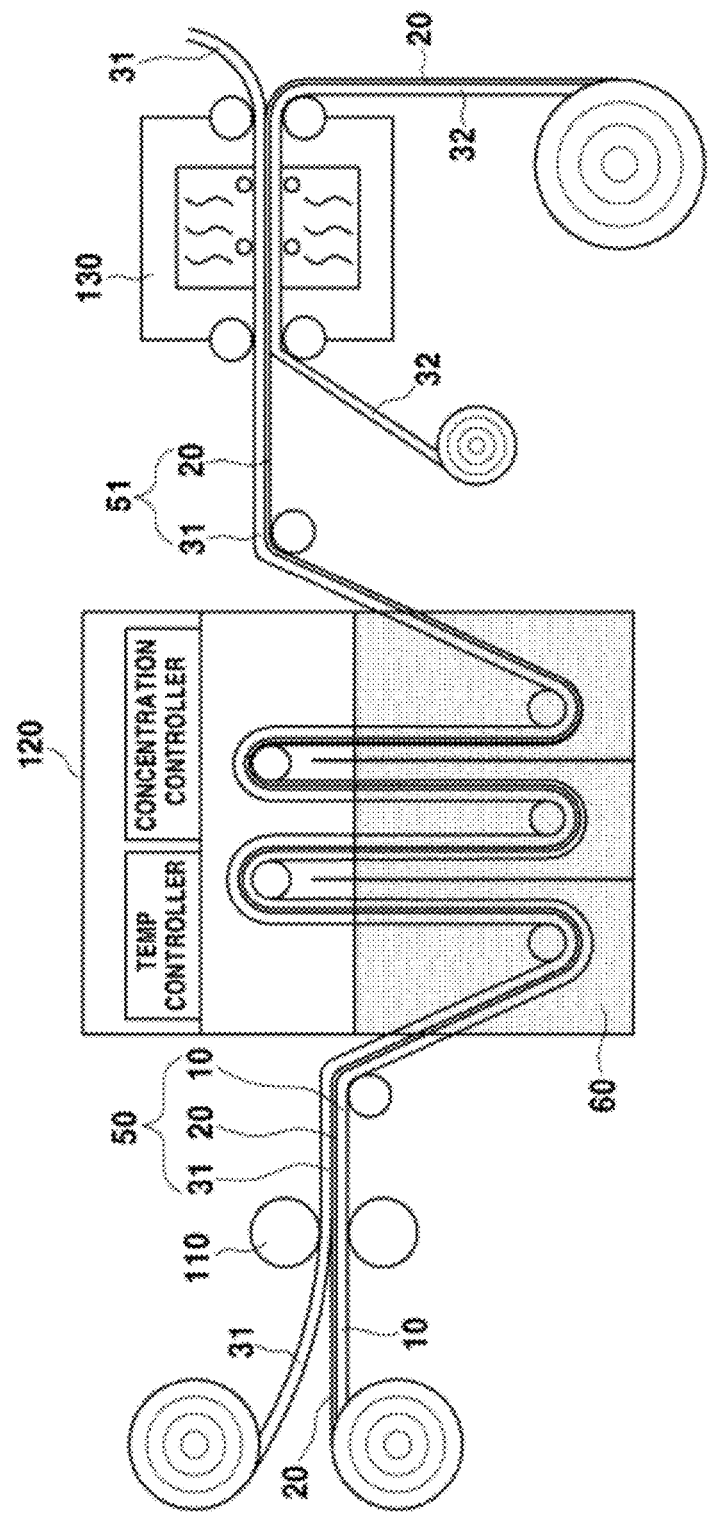
FIG. 2 is a diagram showing a graphene roll-to-roll transfer apparatus in accordance with an illustrative embodiment.

The etching process of removing the metal substrate may be performed one or more times if necessary. By way of example, the etching process may be performed once as depicted in FIG. 1 or the etching process may be repeated several times by using the second roller unit 120 as depicted in FIG. 2. Referring to FIG. 2, in the etching process, numerous rollers are repeatedly arranged at lower and upper sides within a chamber and the layered structure 50 is immersed in the etching solution several times and passes therethrough. By repeating the etching process several times, the substrate included in the layered structure 50 or the substrate including the catalyst layer can be removed completely.

If the etching process is repeated several times as depicted in FIG. 2, etching solutions with different concentrations may be used and an etching degree can be adjusted with the concentrations of the etching solutions. By way of example, if a large amount of the metal substrate needs to be removed at once at an inlet of the second roller unit 120, an etching solution with a high concentration can be used, and at an end of the second roller unit 120 where a small amount of the metal substrate needs to be further removed, an etching solution with a low concentrations can be used.

Through the above-described etching process, the substrate 10 is removed from the layered structure 50 and the graphene layer 20 formed on the substrate 10 is transferred to the first flexible substrate 31 by removing the metal substrate.

As depicted in FIG. 2, if the second roller unit 120 is configured as a chamber, a control device for controlling a temperature within the chamber and/or a control device for controlling concentration of the etching solution may be further provided.

Figure 3:
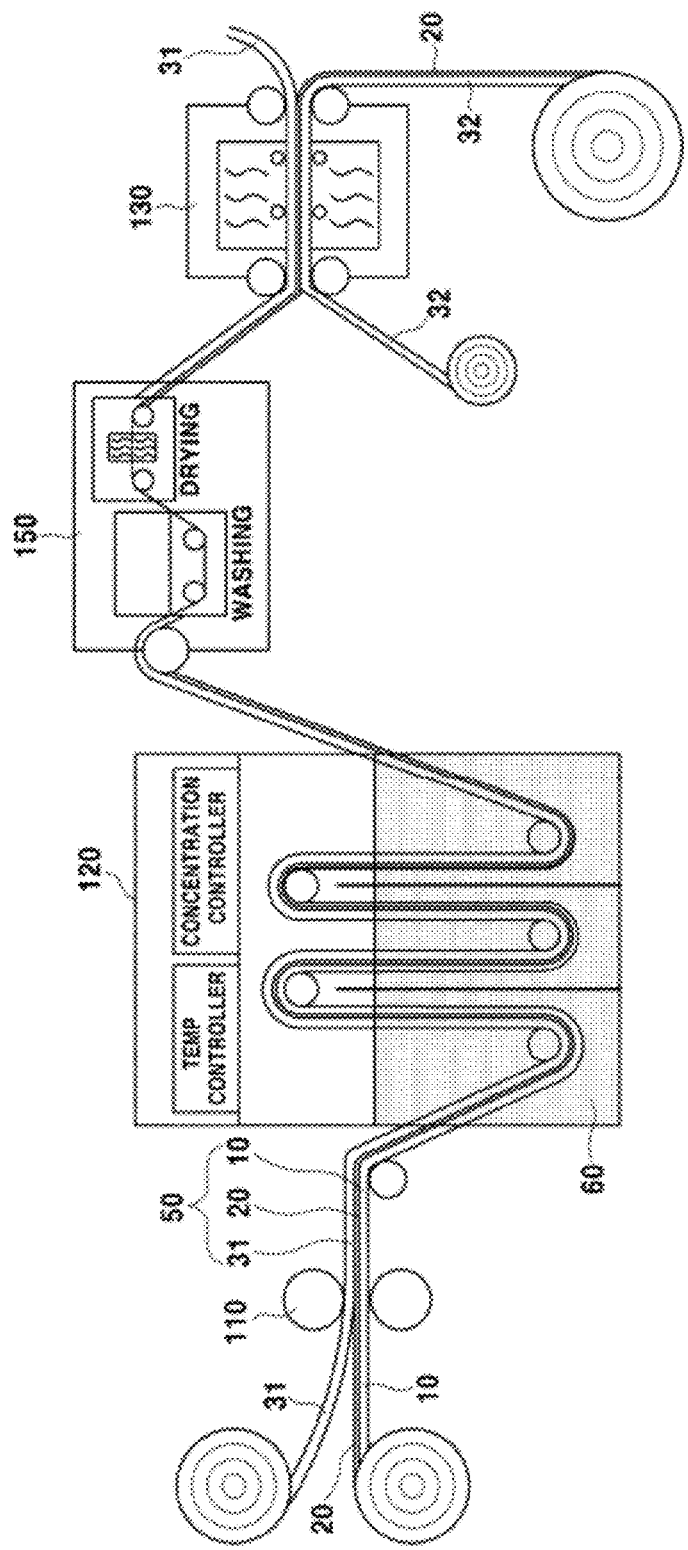
FIG. 3 is a diagram showing a graphene roll-to-roll transfer apparatus further performing a cleaning and/or drying process in accordance with an illustrative embodiment.

Before the graphene layer 20 formed on the first flexible substrate 31 by the above-described method is provided to the third roller unit 130, a cleaning process and/or a drying process may be further performed to the graphene layer 20 transferred onto the first flexible substrate 31. The cleaning process and/or the drying process may be performed by means of a roll-to-roll process. By way of example, as depicted in FIG. 3, each of the cleaning process and/or the drying process may be performed in a fifth roller unit 150 that includes a plurality of rollers. The cleaning process may be performed by using IPA (isopropyl alcohol), deionized water, and the like in order to remove chemical residues from the graphene layer 20.

Finally, the graphene layer 20 on the first flexible substrate 31 is transferred onto the second flexible substrate 32 by using the third roller unit 130 (step S3). To be more specific, the first flexible substrate 31 to which the graphene layer 20 is transferred and the second flexible substrate 32 in contact with the graphene layer 20 are rolled by a transfer roller, so that the graphene layer can be transferred onto the second flexible substrate 32. By performing a heat treatment together with the rolling treatment, the graphene layer 20 may be easily detached from the first flexible substrate 31. Therefore, through the above-described process, the large-area graphene layer 20 can be transferred onto the second flexible substrate 32 from a graphene growth support and the transfer process can be performed more easily with low cost in a short time.

A protection layer 60 may be formed to protect the graphene layer 20 formed on a flexible substrate 30 by the above-described roll-to-roll transfer method. The roll-to-roll process may also be performed to the protection layer 60.

Figure 4B:
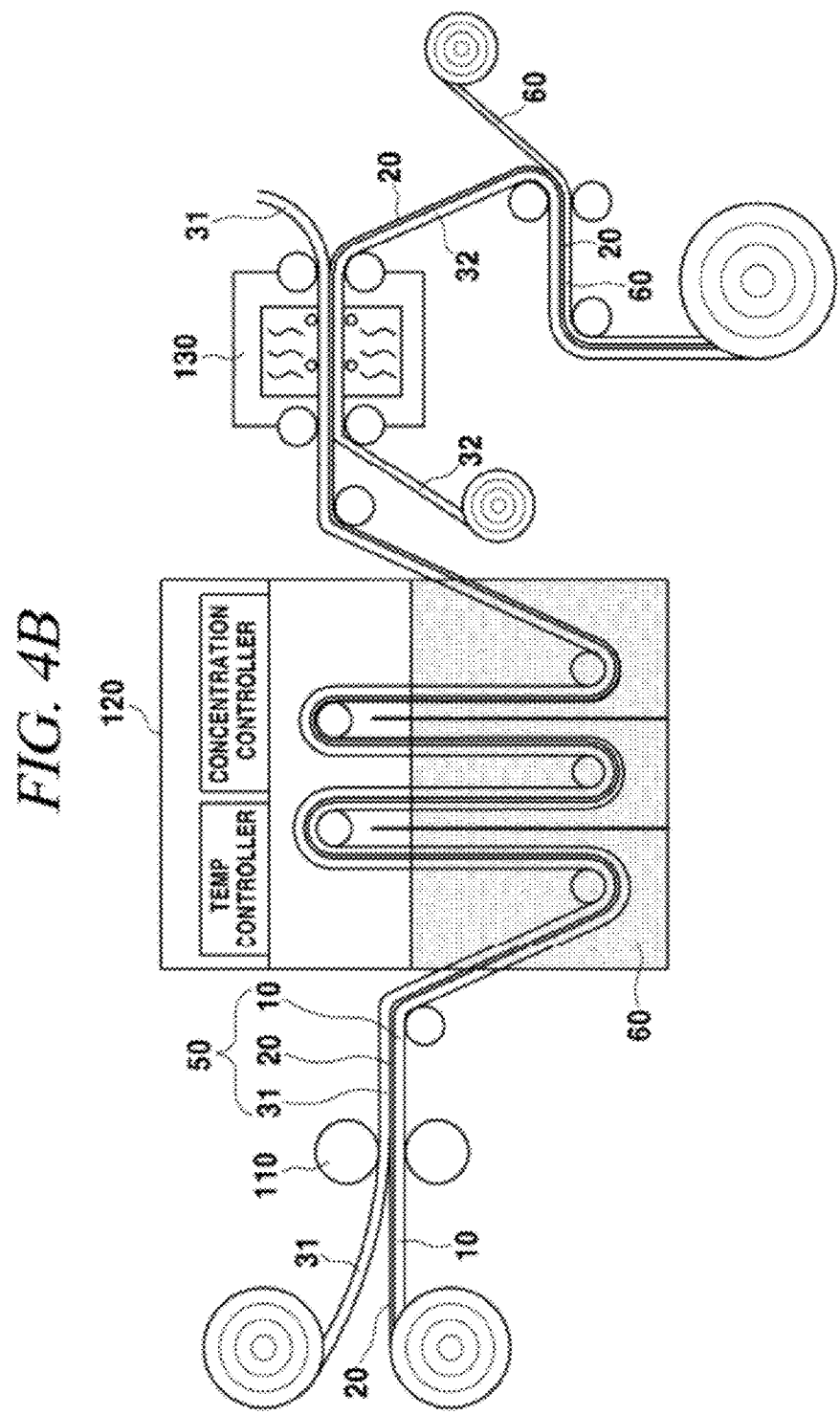

As depicted in FIG. 4A, by way of example, the protection layer 60 may be formed on the graphene layer 20 transferred onto the first flexible substrate 31. Further, as depicted in FIG. 4B, the protection layer 60 may be formed on the graphene layer 20 transferred onto the second flexible substrate 32. The protection layer 60 is used to protect the graphene layer 20 formed on the flexible substrate and is not limited in material. By way of example, the protection layer 60 may include, but is not limited to, PMMA (poly methyl methacrylate), PR (photoresist), ER (electron resist), $SiO_x$ or $AlO_x$.

Figure 5C:
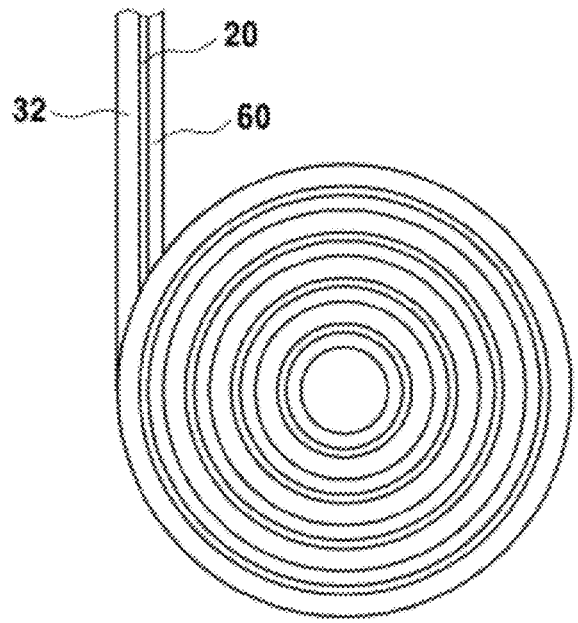
Figure 6A:
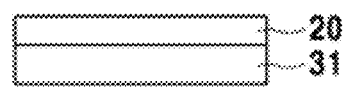
FIGS. 6A to 6D illustrates cross sections of sheet-shaped graphene in accordance with an illustrative embodiment.
Figure 6B:
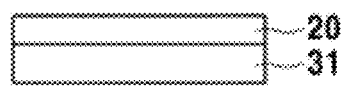
Figure 6C:
Figure 6D:
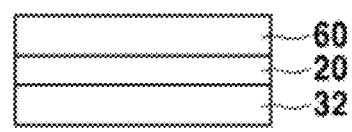

FIG. 5 illustrates a cross section of the graphene layer 20 formed by the above-described method on the flexible substrate 30. Referring to FIGS. 5A to 5C, the graphene layer 20 formed on the flexible substrate 30 has a roll shape. To be more specific, FIG. 5A illustrates the graphene layer 20 on the roll-shaped second flexible substrate 32 which can be manufactured in accordance with the illustrative embodiment depicted in FIG. 2. Further, as depicted in FIG. 5c, the protection layer 60 may be further formed on the graphene layer 20.

As depicted in FIG. 5B, the graphene roll may be formed on the first flexible substrate 31 as well as the second flexible substrate 32.

FIG. 5 illustrates only the roll-shaped graphene layer formed on the flexible substrate, but the graphene layer may be formed in a sheet shape as depicted in FIG. 6. That is, the graphene layer 20 may be formed on a sheet-shaped flexible substrate. By way of example, the graphene layer 20 may be formed on the first flexible substrate 31 or on the second flexible substrate 32 and the protection layer 60 may be further formed on the graphene layer 20. Although not illustrated in FIGS. 5 and 6, the graphene layer formed on the flexible substrate may be formed in various shapes, for example, but not limited to, a foil shape, a tube shape, a plate shape, sheet shape or a wire shape.

Hereinafter, there will be provided detailed explanation with reference to examples of the present disclosure but the present disclosure is not limited thereto.

Figure 7:
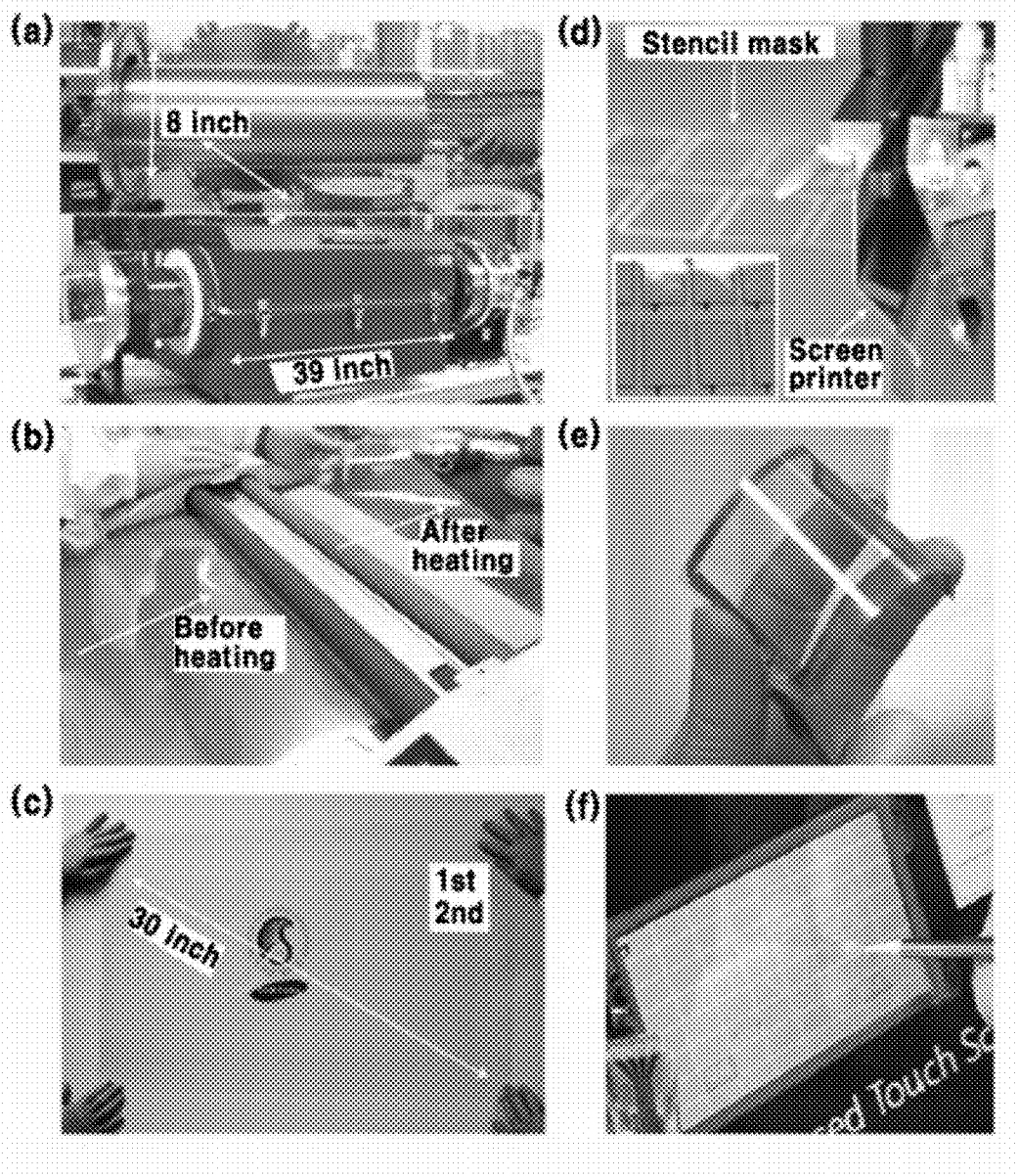
FIG. 7 provides photos showing a procedure of growing and transferring a large-area graphene layer in accordance with an example 1.

FIG. 7 provides photos showing a roll-based synthesis and transfer process of the graphene in accordance with present illustrative embodiments: a) shows a copper foil wrapping around a 7.5-inch quartz tube to be inserted into an 8-inch quartz reactor and the lower image shows a stage in which the copper foil reacts with $CH_4$ and $H_2$ gases at high temperatures; b) shows a roll-to-roll transfer of graphene films from a thermal release tape to a PET film at about 120° C.; c) shows a transparent ultralarge-area graphene film transferred onto a 35-inch PET sheet; d) shows a screen printing process of silver paste electrodes on a graphene/PET film and the inset shows 3.1-inch graphene/PET panels patterned with silver electrodes before assembly; e) shows an assembled graphene/PET touch panel showing outstanding flexibility; and f) shows a graphene-based touch-screen panel connected to a computer with control software.

In the following illustrative embodiments, for graphene synthesis, an 8-inch wide tubular quartz reactor (FIG. 7(a)) is used in a CVD system, allowing a monolayer graphene film to be synthesized on a roll of copper foil with dimensions as large as about 30 inches in a diagonal direction (FIG. 7(c)). A temperature gradient usually exists depending on a radial position within the tubular reactor and this sometimes results in inhomogeneous growth of the graphene on the copper foil. In order to solve this problem, a ~7.5-inch quartz tube wrapped with copper foil is inserted and suspended inside an 8-inch quartz tube. In this manner, radial inhomogeneity in reaction temperatures can be minimized.

EXAMPLE 1

Figure 8:
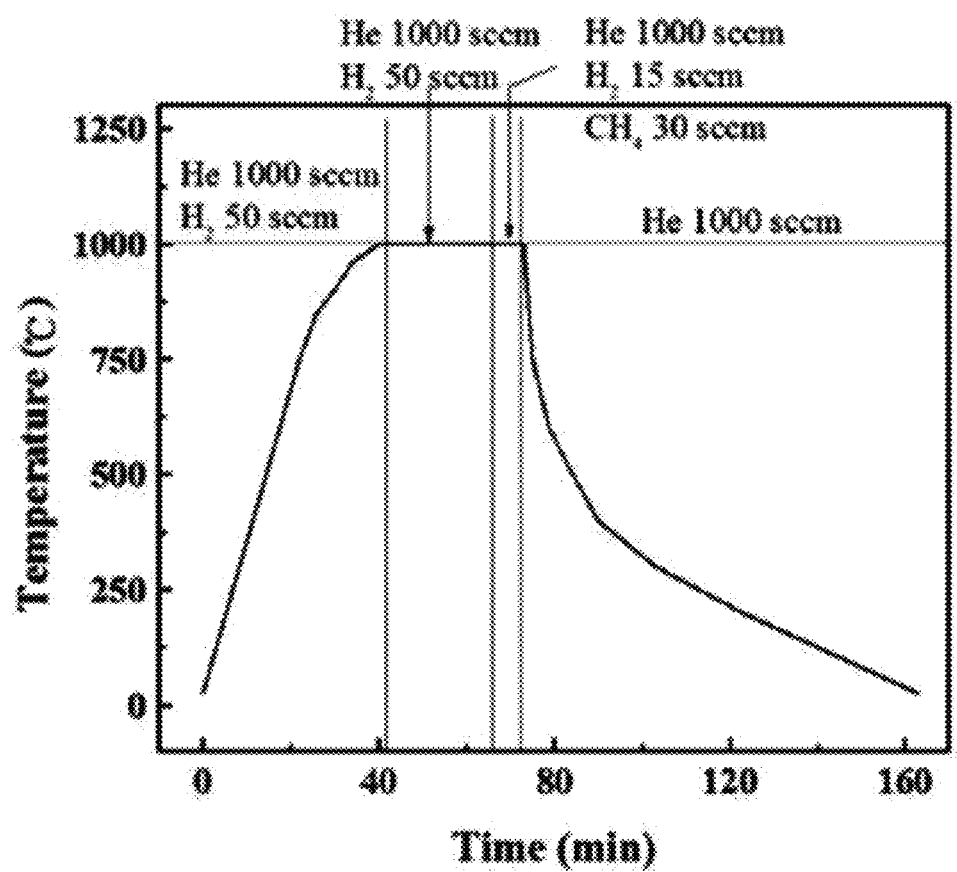
FIG. 8 is a diagram of a process of growing a graphene film on roll-shaped Cu foil in accordance with the example 1.

1. Growth of large-area graphene layer on copper foil Under Atmospheric Pressure Roll-shaped Cu foil (thickness: about 25 μm and dimension: about 210×297 mm², Alfa Aesar Co.) was loaded into a quartz tube and then heated at about 1000° C. under a atmospheric pressure. A gas mixture ($CH_4:H_2:He=50:15:1000$ sccm) containing a carbon source was supplied, so that graphene was grown on the Cu foil. Thereafter, while moving a furnace and flowing Ar or He, the Cu foil was cooled at the normal temperature at a speed of about ~10° C./s in a short time (FIG. 8) and the graphene layer grown on the Cu foil was obtained. The obtained graphene was transferred to a PET substrate and transmittance (about 95% at about 550 nm) was measured and depicted in a graph (FIG. 9(b)).

2. Roll-to-roll transfer process

Then, a thermal release tape was adhered to the graphene layer formed on the Cu foil by an adhesion roller. Subsequently, a layered structure of Cu foil-graphene layer-thermal release tape was immersed in an etching solution of about 0.5 M $FeCl_3$ or ammonium persulfate (($NH_4)_2S_2O_8$) and the Cu foil was etched and removed through an electrochemical reaction. Thereafter, the graphene layer was contacted to a second flexible substrate and rolled by a transfer roller with applying heat thereto, so that the graphene layer was detached from the thermal release tape. In this manner, the graphene layer was transferred to the second flexible substrate (FIG. 7).

Figure 9:
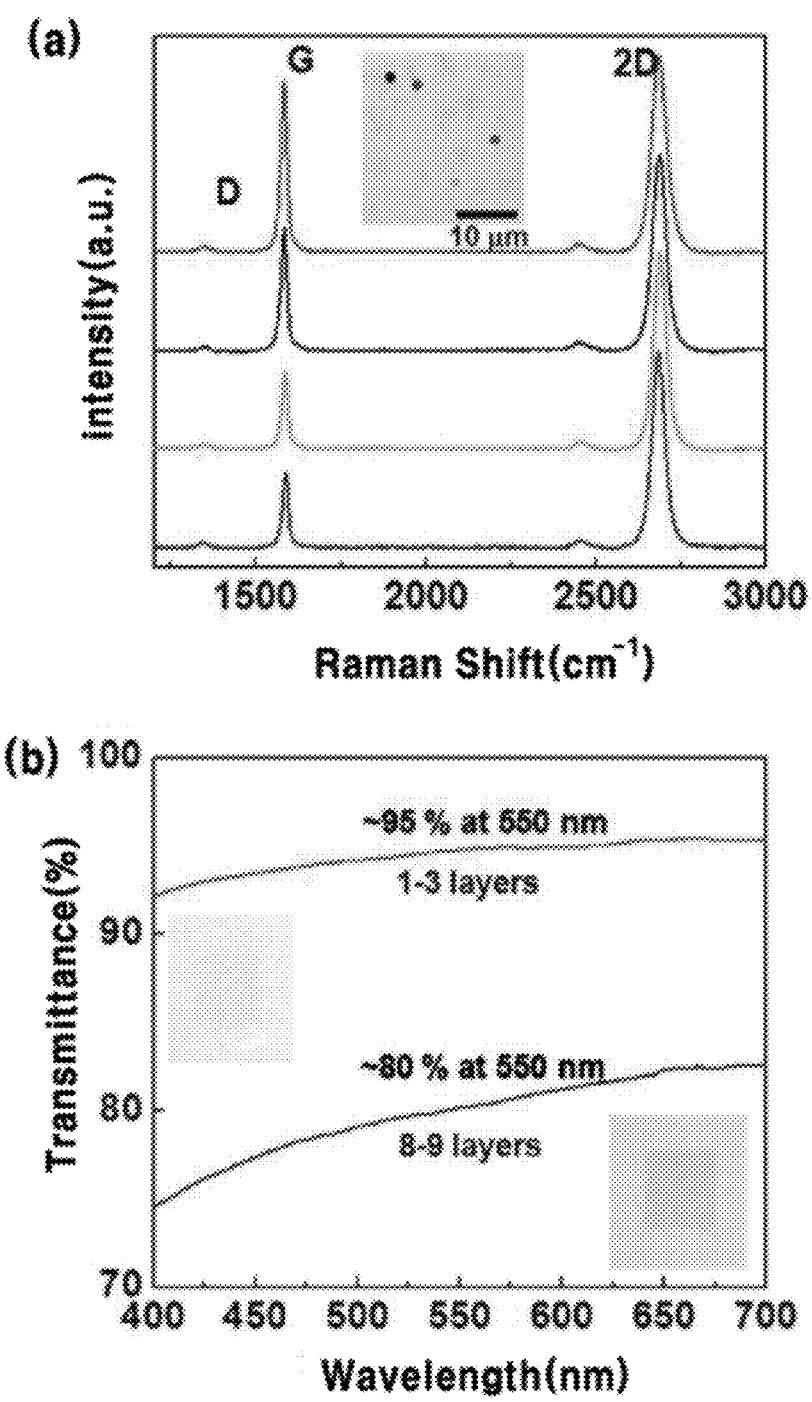
FIG. 9 is a graph showing optical characteristics of the graphene film grown on the Cu foil in accordance with the example 1.

FIG. 9 is a spectrum showing optical characteristics of a graphene layer grown on a graphene growth support in accordance with the present example. A Raman spectrum of FIG. 9(a) shows that the graphene layer synthesized on the graphene growth support foil including a graphene growth metal catalyst layer dominantly includes a monolayer or bilayer of graphene and includes a small D-band peak that represents a high-quality graphene structure. Referring to FIG. 9(b), the graphene layer grown on the graphene growth support has transmittance of about 95% and sheet resistance of about ~510 Ohm/square.

EXAMPLE 2

A roll-to-roll transfer process in accordance with the present example includes the following steps (see FIG. 1): (i) adhesion of polymer supports to a graphene layer on copper foil; (ii) etching of the copper foil; and (iii) release of the graphene layer and transfer onto a target substrate.

In the adhesion step, the graphene layer, grown on the copper foil, was adhered to a thin polymer film coated with an adhesive layer by passing between two rollers. In the subsequent step, the copper foil was removed through an electrochemical reaction with an aqueous 0.1 M ammonium persulphate solution (($NH_4)_2S_2O_8$). Finally, the graphene layer was transferred from the polymer support onto the target substrate by removing an adhesive force holding the graphene layer. When using a thermal release tape, the graphene layer was detached from the tape and released to counter-substrates by a thermal treatment (FIG. 1). If the target substrate is directly bonded to the copper foil in the first step by permanent adhesion, the third step is not needed.

In the first step of synthesis, a roll of copper foil was inserted into a tubular quartz tube and then heated to about 1000° C. with a $H_2$ flow rate of about 8 sccm at about 90 mtorr. After reaching 1000° C., the sample was annealed for about 30 minutes without changing the flow rate or pressure. The copper foil was additionally heat-treated to increase a grain size from a few micrometers to about ~100 mm. A gas mixture of $CH_4$ and $H_2$ was then flowed at about 460 mtorr with rates of about 24 sccm and about 8 sccm for about 30 minutes, respectively. Finally, the sample was rapidly cooled to the room temperature (about ~10° C./s) with flowing $H_2$ under a pressure of about 90 mtorr (FIG. 7).

After the growth, the graphene layer grown on the copper foil was adhered to a thermal release tape (Jinsung Chemical Co. and Nitto Denko Co.) by applying soft pressure (about ~0.2 MPa) between two rollers. After etching the copper foil in a plastic bath filled with a copper etching solution, the transferred graphene film on the tape was rinsed with deionized water to remove residual etching solution, and was then ready to be transferred to any kind of flat or curved surface on demand. The graphene film on the thermal release tape was inserted between the rollers together with a target substrate and exposed to mild heat (about ~90° C. to about 120° C.), achieving a transfer rate of about ~150 mm/min to about 200 mm/min and resulting in the transfer of the graphene layer from the tape to the target substrate (FIG. 7(b)). By repeating these steps on the same substrate, a multilayered graphene film was prepared and the multilayered graphene film exhibited enhanced electrical and optical characteristics. FIG. 7(c) shows a 30-inch multilayer graphene film transferred to a roll of 188-μm-thick polyethylene terephthalate (PET) substrate. FIG. 7(d) shows a screen-printing process used to fabricate four-wire touch-screen panels based on graphene/PET transparent conductive films. After printing electrodes and dot spacers, upper and lower panels were carefully assembled and connected to a controller installed in a laptop computer (FIGS. 7(e) to 7(f)) and these panels showed extraordinary flexibility as described below (FIG. 11d). Scalability and processability of the CVD graphene and roll-to-roll method described in the present example are expected to enable continuous production of graphene-based electronic devices at large scales.

Figure 10:
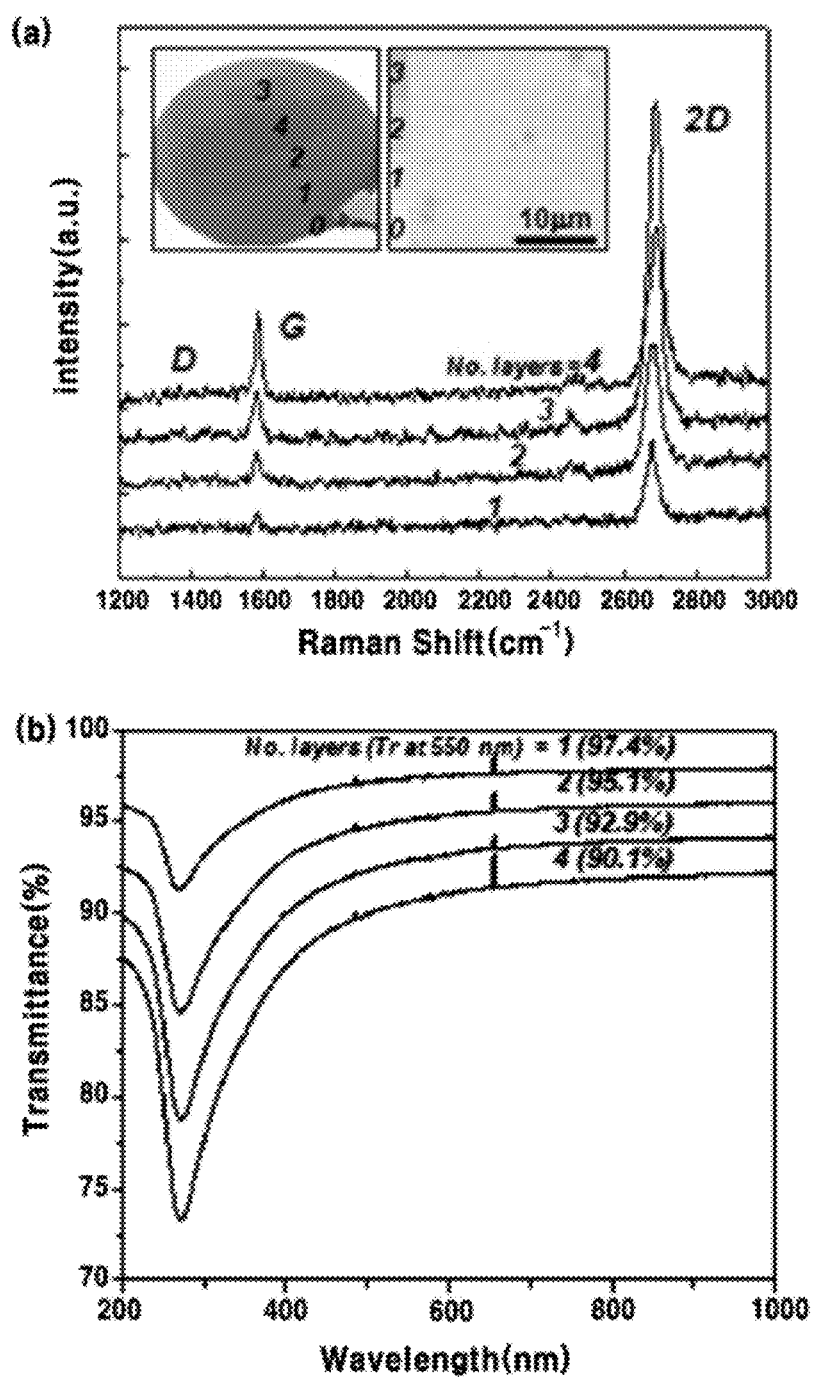
FIG. 10 is a graph showing optical characteristics of a graphene layer grown on Cu foil in accordance with an example 2.

FIG. 10 shows optical characteristics of a graphene film grown on a $SiO_2$/silicon substrate and a PET substrate by using a roll-to-roll transfer method. FIG. 10(*a*) shows a Raman spectrum of graphene films with different numbers of stacked layers and a left inset shows a photograph of transferred graphene layers on a 4-inch $SiO_2$ (300 nm)/silicon wafer. The right inset is a typical optical microscope image of monolayer graphene showing >95% monolayer coverage. A PMMA-assisted transfer method is used for this sample. FIG. 10(*b*) shows a UV-vis spectrum of a graphene film transferred onto a quartz substrate by using a roll-to-roll transfer method. As described above, the graphene film seems to be predominantly composed of a graphene monolayer when analyzed using Raman spectra (FIG. 10(*a*)). However, atomic force microscope (AFM) images and transmission electron microscope (TEM) images often show bilayer and multilayer islands (FIGS. 12 and 15. As the graphene layers were transferred one after another, intensities of G- and 2D-band peaks increased together, but their ratios did not change significantly. This was because hexagonal lattices of upper and lower layers were randomly oriented, unlike in graphite. Thus, original properties of each mono layer remained unchanged even after the monolayers were stacked into multilayers. This was clearly different from a case of multilayer graphene exfoliated from graphite crystals. The randomly stacked layers behaved independently without a significant change in electronic band structures, and overall conductivity of the graphene layers appeared to be proportional to the number of stacked layers. The optical transmittance was usually reduced by about ~2.2% to about 2.3% for additional transfer, implying that an average thickness was of a monolayer.

A unique electronic band structure of graphene allows modulation of charge carrier concentrations depending on an electric field induced by gate bias or chemical doping, resulting in enhancement of sheet resistance. Electrical characteristics of the graphene film formed by using layer-by-layer stacking methods were also investigated.

FIG. 11 is a graph showing electrical characteristics of a graphene layer transferred by a roll-to-roll method.

Figure 11A:
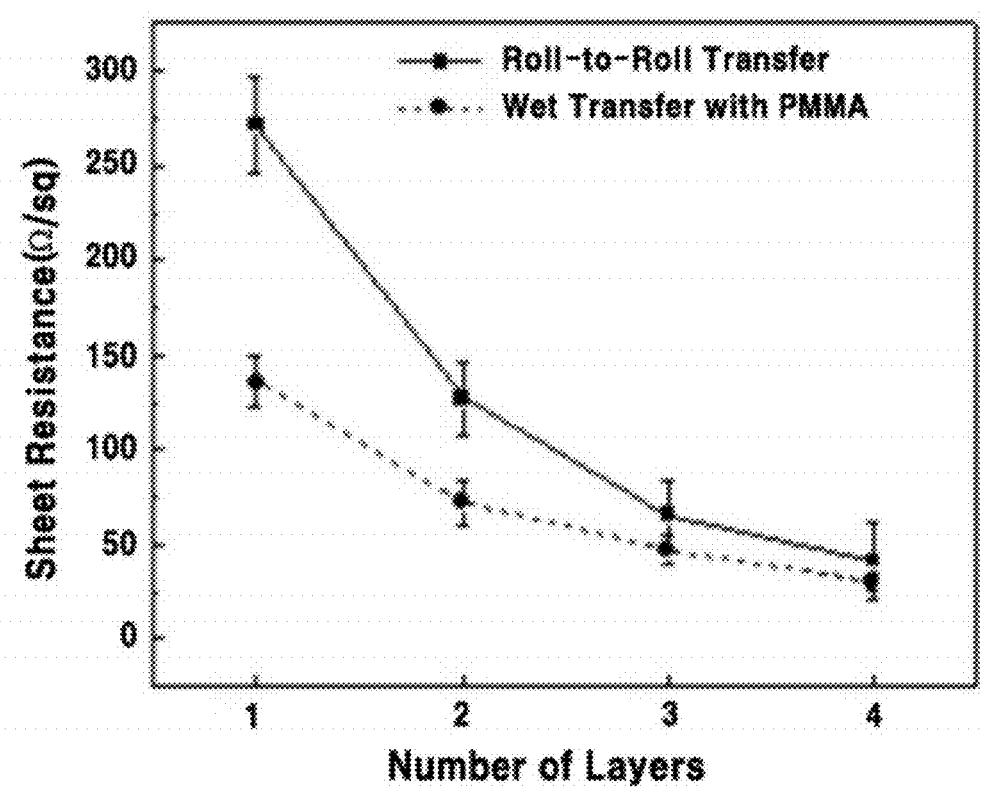
Figure 11B:
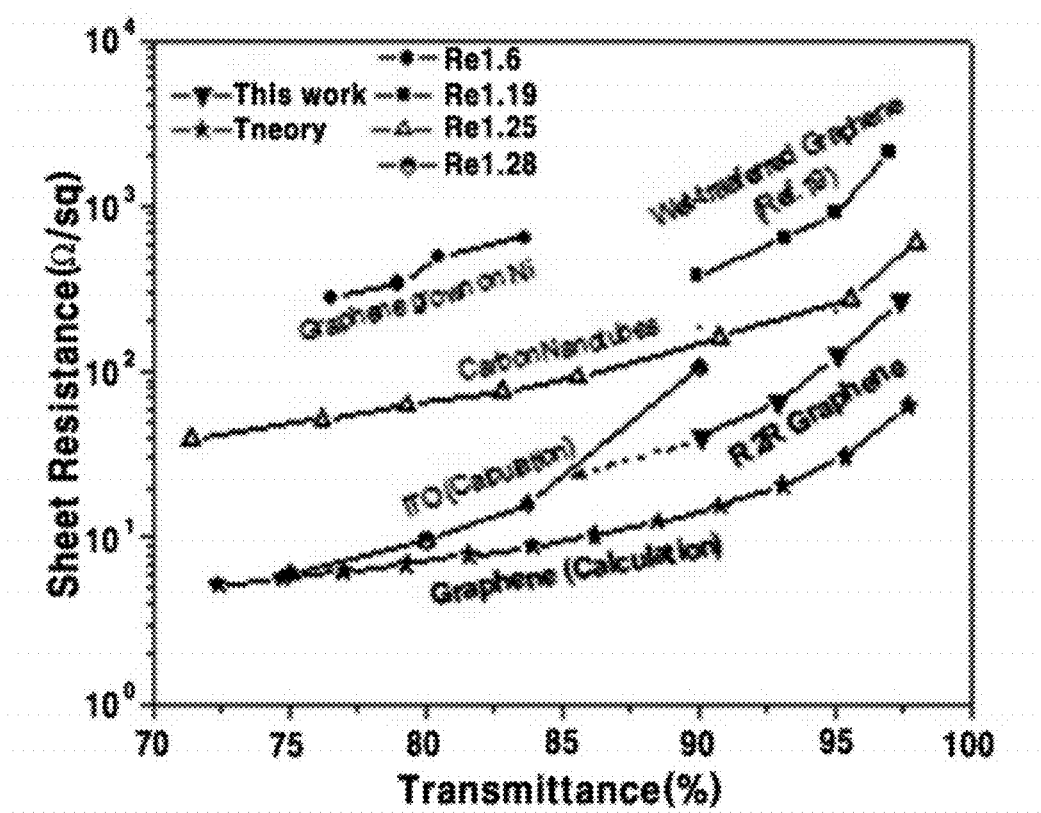
Figure 11D:
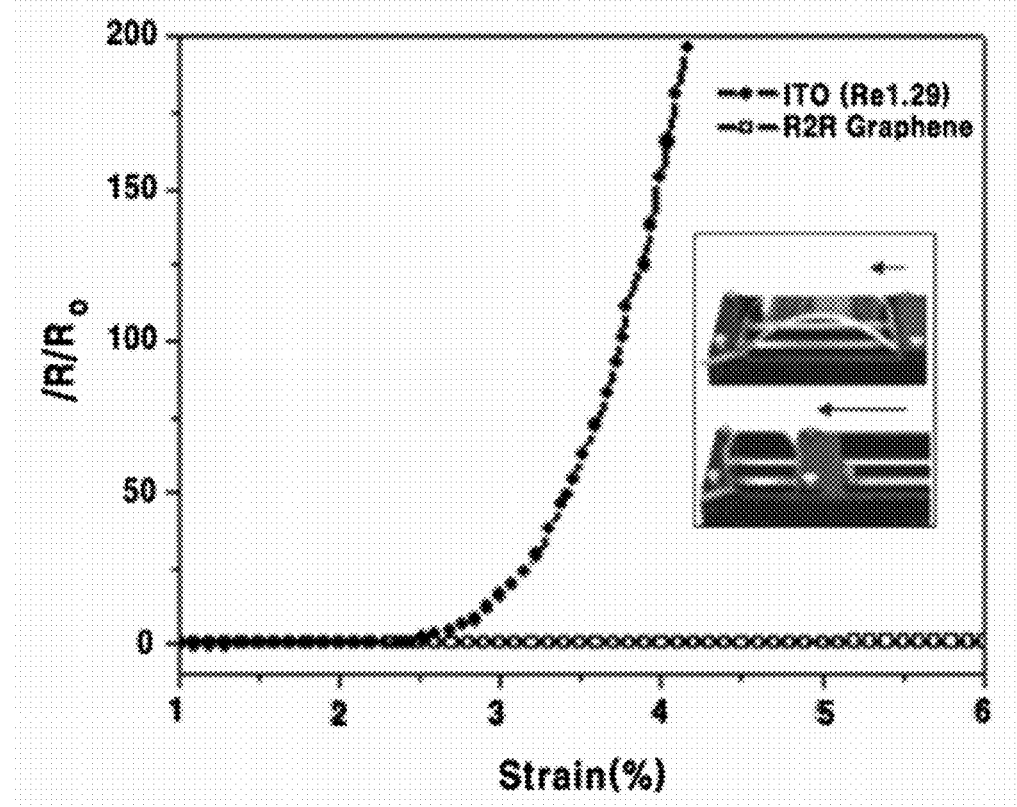

FIG. 11A shows sheet resistance of transferred graphene films using a roll-to-roll (R2R) dry-transfer method combined with thermal release tapes and a PMMA-assisted wet-transfer method. FIG. 11B shows a comparison of sheet resistance from the preset example and transmittance plots taken from other reference documents and in FIG. 11B, the dashed arrows indicate expected sheet resistances at lower transmittance. The scheme was borrowed from one of the reference documents [Li, X. et al. Transfer of large-area graphene films for high-performance transparent conducive electrodes. Nano Lett. 9, 4359-4363 (2009)].

FIG. 11C shows electrical properties of a monolayer graphene hall bar device in a vacuum Four-probe resistivity was measured as a function of gate voltage in the monolayer graphene hall bar at the room temperature and T=6 K. A QHE effect at T=6 K and B=9 T was measured in the same device. Longitudinal resistivity $\Sigma_{xx}$ and hall conductivity $\sigma_{xy}$ were plotted as function of gate voltage. A sequence of the first three half-integer plateaus corresponding to v=2, 6 and 10, typical for monolayer graphene, was clearly seen. Hall effect mobility of the device was $\mu_{Hall}$=7350 $cm^{-2}V^{-1}s^{-1}$ at about 6 K (about ~5100 $cm^{-2}V^{-1}s^{-1}$ at about 295 K) (scale bar (inset)=3 μm).

FIG. 11D shows electromechanical characteristics of graphene-based touch-screen devices as compared with ITO/PET electrodes under tensile strain.

Figure 13:
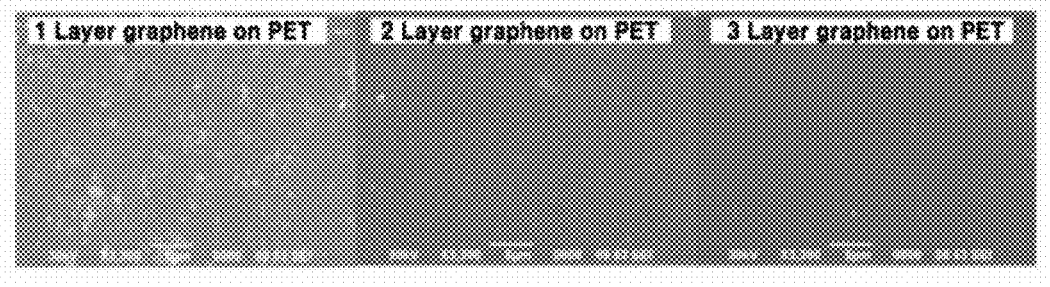
FIG. 13 is a scanning electron microscope (SEM) image obtained after the graphene layer grown on the Cu foil in accordance with the example 2 is transferred to a flexible PET substrate by a roll-to-roll transfer method.

Typically, sheet resistance of a graphene film with 97.4% transmittance is as low as about ~125Ω☐$^{-1}$ when it is transferred by a soluble polymer support such as polymethyl methacrylate (PMMA) (FIG. 11A). A transferrable size achievable using a wet-transfer method is limited to less than a few inches of wafer due to weak mechanical strength of spin-coated PMMA layers. However, a scale of roll-to-roll dry transfer assisted by a thermal release tape is in principle unlimited. In the process of roll-to-roll dry transfer, a first layer graphene sometimes shows approximately two to three times larger sheet resistance than that of the PMMA-assisted wet-transfer method. As the number of layers increases, the resistance drops faster as compared with the wet-transfer method (FIG. 11B). The present inventors postulated that the adhesion of the first layer to the substrate is not strong enough for complete separation of the graphene film from the thermal release tape (FIG. 13). As a result, there can be mechanical damage on the graphene film, leading to an increase in the overall sheet resistance. Since additional layers are not directly affected by the adhesion to the substrate surface, the sheet resistance of multilayered graphene prepared by the roll-to-roll method does not differ much from that for the wet-transfer case.

Standard electron-beam lithography has been used to fabricate graphene hall bars on conventional 300-nm $SiO_2$/Si substrates (FIG. 11C). FIG. 11C shows electrical characteristics of a monolayer graphene hall bar device. Four-probe resistivity was measured as a function of gate voltage in the monolayer graphene hall bar at the room temperature and T=6 K. A QHE effect at T=6 K and B=9 T was measured in the same device. Longitudinal resistivity $\rho_{xx}$ and hall conductivity $\sigma_{xy}$ were plotted as a function of gate voltage. A sequence of the first three half-integer plateaus corresponding to v=2, 6 and 10, typical for monolayer graphene, was clearly seen. Hall effect mobility of the device was $\mu_{Hall}$=7350 $cm^{-2}V^{-1}s^{-1}$ at about 6 K (about ~5100 $cm^{-2}V^{-1}s^{-1}$ at about 295 K) (scale bar (inset)=3 μm). The present inventors observed graphene specific gate bias dependence of the resistance with a sharp Dirac peak and an effective hall mobility of 7,350 $cm^2V^{-1}s^{-1}$ at low temperatures. This allows the observation of the quantum hall effect (QHE) at 6 K and a magnetic field of B=9 T (FIG. 11C, right). A fingerprint of monolayer graphene, the half-integer quantum hall effect, was observed with plateaus at filling factors of v=2, 6 and 10 at $R_{xy}$=½, ⅙ and 1/10(h/$e^2$), respectively. Although a sequence of the plateaus remained for both a electron side and a hole side, there was a slight deviation from fully quantized values on the hole side.

Further, electromechanical characteristics of graphene-PET touch-screen panels were measured (FIG. 11D). FIG. 11D shows that unlike an ITO-based touch panel, which easily breaks under about ~2% to about 3% strain, a graphene-based panel resists up to about 6% strain. This is limited not by the graphene itself, but by a printed silver electrodes (FIG. 11D).

Figure 12:
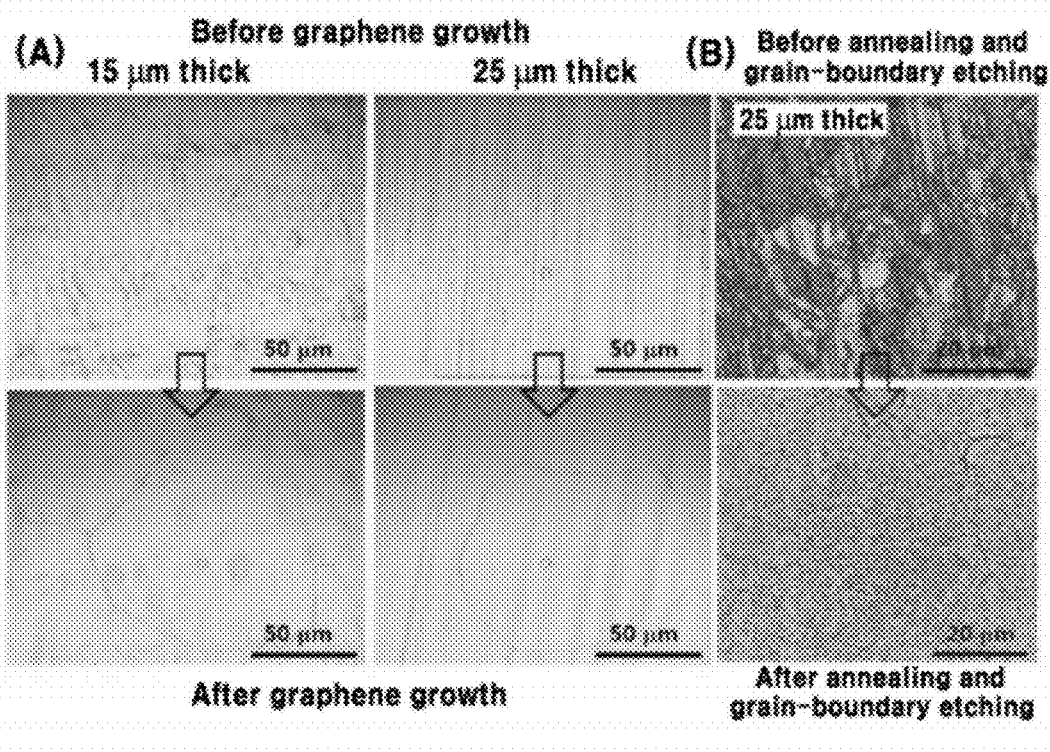
FIG. 12 is a image showing a grain size when the graphene layer is grown on the Cu foil having various thicknesses in accordance with the example 2, the image confirming that as a graphene layer is grown at high temperatures, a grain size is increased.

FIG. 12 is an image showing a grain size when the graphene layer is grown on the Cu foil having various thicknesses in accordance with the example 2, the image confirming that as a graphene layer is grown at high temperatures, a grain size of Cu is increased.

FIG. 13 is a scanning electron microscope (SEM) image obtained after the graphene layer grown on the Cu foil in accordance with the example 2 is transferred to a flexible PET substrate by a roll-to-roll transfer method.

Figure 14:
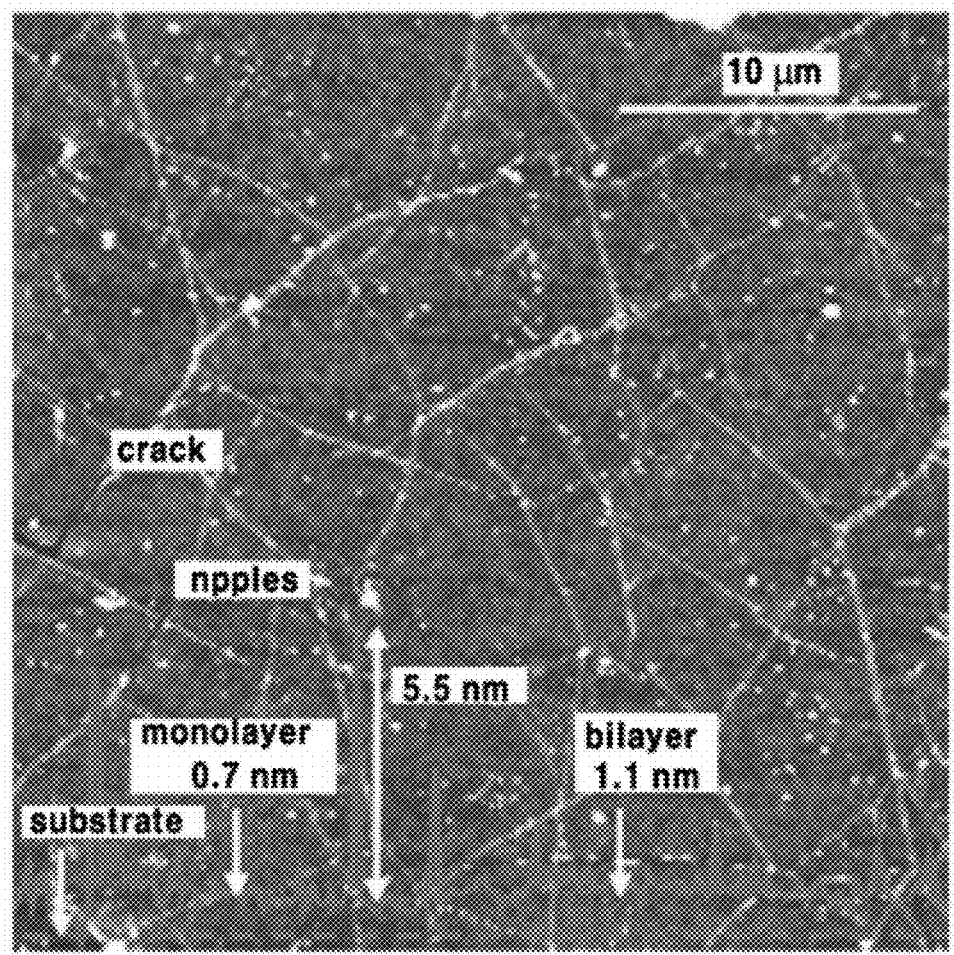
FIG. 14 is an atomic force microscope (AFM) image obtained after the graphene layer grown on the Cu foil in accordance with the example 2 is transferred to a flexible PET substrate.

FIG. 14 is an atomic force microscope (AFM) image obtained after the graphene layer grown on the Cu foil in accordance with the example 2 is transferred to a flexible PET substrate.

Figure 15:
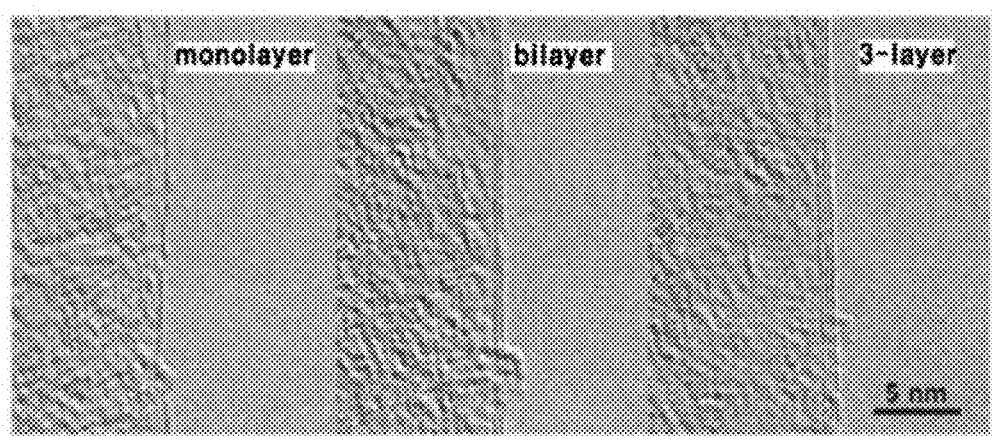
FIG. 15 is a image showing the number of graphene layers observed by a transmission electron microscope (TEM), the graphene layers grown on the Cu foil in accordance with the example 2 and shifted to a TEM grid.

FIG. 15 is an image showing the number of graphene layers observed by a transmission electron microscope (TEM), after that the graphene layers are grown on the Cu foil in accordance with the example 2 and shifted to a TEM grid.

In conclusion, there has been developed and demonstrated a roll-to-roll method of manufacturing graphene on a large-area copper substrate. Multiple transfer of graphene films considerably improves its electrical and optical characteristics. Given the scalability and processability of roll-to-roll and CVD methods and the flexibility and conductivity of graphene films, it can be anticipated that commercial production of large-scale transparent electrodes, replacing ITO, will be realized in the near future.

There have been provided some examples for purpose of illustration but the present disclosure is not limited thereto. It would be understood by those skilled in the art that various changes and modifications may be made without changing technical conception and essential features of the present disclosure.

What is claimed is:

1. A method for transferring a graphene layer formed on a forming substrate, comprising:
    passing the forming substrate having the graphene layer formed thereon along with a separate layer of a first flexible substrate through a first roller unit to form a layered structure including the forming substrate, the graphene layer and the first flexible substrate; and
    passing the layered structure through a second roller unit while immersing the layered structure in an etching solution, so that the forming substrate is removed from the layered structure by the etching solution and the graphene layer is transferred onto the first flexible substrate while the layered structure is being passed through the etching solution.

2. The graphene roll-to-roll transfer method of claim 1, further comprising: transferring the graphene layer on the first flexible substrate onto a second flexible substrate by a third roller unit.

3. The graphene roll-to-roll transfer method of claim 2, wherein the transferring the graphene layer onto a second flexible substrate is performed by rolling the first flexible substrate onto which the graphene layer is transferred and the second flexible substrate in contact with the graphene layer by a transfer roller.

4. The graphene roll-to-roll transfer method of claim 2, further comprising: performing a heat treatment to the graphene layer at the same time when the graphene layer is transferred onto the second flexible substrate.

5. The graphene roll-to-roll transfer method of claim 2, further comprising:
    forming a protection layer on the graphene layer transferred onto the first flexible substrate or on the graphene layer transferred onto the second flexible substrate by a fourth roller unit.

6. The graphene roll-to-roll transfer method of claim 1, further comprising: cleaning and/or drying the graphene layer transferred onto the first flexible substrate.

7. The graphene roll-to-roll transfer method of claim 1, wherein the forming substrate has one or more characteristics including transparency, flexibility, and extendibility.

8. The graphene roll-to-roll transfer method of claim 7, wherein the forming substrate has a roll shape, a foil shape, a tube shape, a plate shape, a sheet shape or a wire shape.

9. The graphene roll-to-roll transfer method of claim 1, wherein the graphene layer formed on the forming substrate is formed by supplying heat and a reaction gas containing a carbon source to the forming substrate for a reaction to grow graphene on the substrate.

10. The graphene roll-to-roll transfer method of claim 1, wherein each of the first flexible substrate and the second flexible substrate has one or more characteristics including transparency, flexibility, and extendibility.

11. The graphene roll-to-roll transfer method of claim 1, wherein each of the first flexible substrate and the second flexible substrate contains a polymer.

12. The graphene roll-to-roll transfer method of claim 1, wherein the first flexible substrate contains a thermal release polymer.

13. The graphene roll-to-roll transfer method of claim 1, wherein an adhesive layer is formed on the first flexible substrate which is to be in contact with the graphene layer.

14. The graphene roll-to-roll transfer method of claim 13, wherein the adhesive layer is formed of an adhesive tape, glue, epoxy resin, a photosoftening tape (UV, visible light, UV/EB), a thermal release tape or a water-soluble tape.

15. The graphene roll-to-roll transfer method of claim 1, wherein the forming substrate contains one or more metals or alloys selected from the group consisting of silicon, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

16. The graphene roll-to-roll transfer method of claim 1, wherein the forming substrate further contains a catalyst layer.

17. The graphene roll-to-roll transfer method of claim 16, wherein the catalyst layer contains one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge.

* * * * *

UNITED STATES PATENT AND TRADEMARK OFFICE
CERTIFICATE OF CORRECTION

PATENT NO. : 8,916,057 B2  
APPLICATION NO. : 13/447548  
DATED : December 23, 2014  
INVENTOR(S) : Hong et al.

Page 1 of 1

It is certified that error appears in the above-identified patent and that said Letters Patent is hereby corrected as shown below:

On the title page item [63], delete "Oct. 16, 2010" and insert --Oct. 18, 2010--.

Signed and Sealed this  
Nineteenth Day of May, 2015

Michelle K. Lee  
*Director of the United States Patent and Trademark Office*